United States Patent
Vasudeva

(10) Patent No.: US 9,386,763 B2
(45) Date of Patent: Jul. 12, 2016

(54) COMBINED POWER BAR AND BED BUG TRAP

(71) Applicant: Bug Elimination and Prevention Corporation, Waterloo (CA)

(72) Inventor: Kailash C. Vasudeva, Waterloo (CA)

(73) Assignee: BUG ELIMINATION AND PREVENTION CORPORATION, Waterloo (CA)

(*) Notice: Subject to any disclaimer, the term of this patent is extended or adjusted under 35 U.S.C. 154(b) by 61 days.

(21) Appl. No.: 14/414,722

(22) PCT Filed: Aug. 1, 2013

(86) PCT No.: PCT/CA2013/000681
§ 371 (c)(1),
(2) Date: Jan. 14, 2015

(87) PCT Pub. No.: WO2014/019073
PCT Pub. Date: Feb. 6, 2014

(65) Prior Publication Data
US 2015/0216159 A1    Aug. 6, 2015

Related U.S. Application Data

(60) Provisional application No. 61/678,142, filed on Aug. 1, 2012.

(51) Int. Cl.
*A01M 1/10* (2006.01)
*A01M 1/14* (2006.01)
*A01M 1/02* (2006.01)
*A01M 99/00* (2006.01)
*H01R 25/00* (2006.01)

(52) U.S. Cl.
CPC .............. *A01M 1/103* (2013.01); *A01M 1/023* (2013.01); *A01M 1/026* (2013.01); *A01M 1/14* (2013.01); *A01M 99/00* (2013.01); *H01R 25/003* (2013.01)

(58) Field of Classification Search
CPC ..... A01M 1/103; A01M 1/023; A01M 1/026; A01M 1/14; A01M 23/38
See application file for complete search history.

(56) References Cited

U.S. PATENT DOCUMENTS

| | | | | |
|---|---|---|---|---|
| 5,771,628 A | * | 6/1998 | Nobbs | A01M 1/14 43/121 |
| 8,904,701 B2 | | 12/2014 | Vasudeva | |
| 2009/0282728 A1 | * | 11/2009 | McKnight | A01M 1/026 43/109 |
| 2009/0313883 A1 | * | 12/2009 | Olson | A01M 1/023 43/131 |
| 2012/0246998 A1 | * | 10/2012 | Vasudeva | A01M 1/023 43/114 |
| 2013/0111801 A1 | * | 5/2013 | White | A01K 5/0142 43/109 |
| 2013/0180162 A1 | * | 7/2013 | Vasudeva | A01M 1/103 43/123 |
| 2014/0075825 A1 | | 3/2014 | Vasudeva et al. | |
| 2015/0173339 A1 | * | 6/2015 | Stier | A01M 1/103 43/107 |

* cited by examiner

*Primary Examiner* — Gary Hoge

(57) ABSTRACT

A bed bug trap (2) is combined with a conventional power bar (1). Bed bugs can enter the trap via a small gap (6) between the power bar portion and the bed bug trap, where they then fall off a small precipice (14) and onto a glue strip (4, 5) or the like. The assembly can be easily opened for inspection and replacement of glue cartridges (5). Attractants (7, 17, 13) can be provided, including heat via a small heating element (7), chemical attractants (17), and carbon dioxide via a carbon dioxide generator (13). The assembly can be adapted for use with other insects, or an additional trap (91, 92; 110) can be attached for other insects.

18 Claims, 11 Drawing Sheets

COMBINED POWER BAR AND BED BUG TRAP

TECHNICAL FIELD

This invention relates to a power bar in combination with a trap for monitoring and trapping insects, especially bed bugs.

For convenience and clarity throughout this specification, reference will be made primarily to bed bugs. However, except where otherwise stated or where the context dictates otherwise, it should be understood that the invention can be adapted to use for insects other than bed bugs, or in addition to bed bugs.

BACKGROUND ART

As is well known, insects have been damaging or destroying food and other articles, such as grain, fruit and wood dwellings or other property for centuries. Such insects are often invisible, being contained by the articles being destroyed, or hiding in cracks and crevices. Detecting the presence of the insects can sometimes be challenging, and is a necessary first step before application some means of control and/or elimination.

Bed bugs are an example of pests that can be difficult to detect. Adult bed bugs may be only about 6 millimeters long and 5-6 millimeters wide. They cannot fly, but they can move fairly quickly. When disturbed or when not actively hunting for their food source, namely the blood of animals and human beings, they actively seek shelter in dark cracks and crevices. Since they spend most of their time sheltering rather than feeding, they can be very difficult to detect simply by visual examination.

Bed bug populations have resurged in recent years, particularly throughout parts of North America, Europe, and Australia. The increase of international travel in recent decades has contributed to this resurgence. There are many aspects of bed bugs that make it difficult to eradicate them once they have established a presence in a location. They are most commonly found in rooms where people sleep, and they generally hide near the bed or other furniture used for sleeping. Their flattened bodies allow them to conceal themselves in cracks and crevices around the room and within furniture.

Favoured hiding sites include the bed frame, mattress, and box spring, as well as in baseboards and behind picture frames. Clutter around the room offers additional sites for these bugs to hide and increases the difficulty in eliminating them once they have become established. Thus there is a need for efficient and early detection, so that trapping and monitoring tools can be deployed.

Hotels are some of the most likely places for the presence of bed bugs, due to the transient hotel guests, and coming and going of their suitcases and possessions. It is extremely important for anyone with a bed bug problem, but for hotels in particular, to be able to detect the presence of bed bugs, and preferably to trap them as well, before the problem spreads from room to room.

In the hotel environment especially, but also in homes and other locations, it is also extremely important to avoid the stigma of a bed bug infestation, or even the stigma of the possibility of an infestation. It is therefore desirable to have a bed bug trap which serves another function in parallel, i.e. with no outward indication that it is in fact a bed bug trap.

Since hotel rooms and many household rooms often make use of power bars, the invention recognizes that it would be particularly advantageous to combine the function of a power bar with the function of a bed bug trap. A visitor to the room would perceive just the power bar, without realizing that it is also a bed bug trap.

U.S. Pat. No. 8,316,578 (Faham et al.) discloses a bed bug trap which plugs directly into an electrical outlet, and includes an adhesive surface to capture bed bugs, as well as a heating element to generate warmth to attract the bed bugs. However, its configuration is otherwise quite different from that of the present invention, and it lacks some of the features and flexibility of the present invention, including that it can only be positioned at an electrical outlet.

DISCLOSURE OF INVENTION

In view of the preceding, the invention provides an assembly which combines a power bar with a bed bug trap. More specifically, the assembly has the general configuration of a conventional power bar (with or without surge protection, with or without on/off switch), but with a bed bug trap attached or attachable thereto. The power bar and bed bug trap together define an internal area, accessible by bed bugs via one or more small gaps, the internal area being provided with a glue strip or other suitable trapping means, which may be provided in the form of a removable and replaceable tray, as one example.

In preferred embodiments, the assembly is provided with bed bug attracting means, which may include heat produced by a small heating element, and/or chemical attractants (kairomones and/or pheromones), and/or carbon dioxide generation. A carbon dioxide generator may be attached to the assembly.

In most embodiments, the assembly is configured to be positioned on or secured to a horizontal surface, such as a floor, bedside table or desk for example. In some embodiments, the assembly may be configured for mounting on a vertical surface, such as a wall, baseboard or bed frame element.

In some embodiments, the assembly may also be provided with an air freshening feature. In such embodiments, heat from a heating element used as a bed bug attracting means may also be used to stimulate the air freshener to emit a pleasant scent or fragrance, or the air freshener may be powered directly from the power bar, or it may be passive (for example a fragrance puck).

In some embodiments, heat from a heating element may also accelerate release of a chemical attractant to attract bed bugs to the trap.

As stated previously, the invention is not limited to bed bugs, so the above features may also be applied to attract and capture other insects, with appropriate adaptations depending on the insect(s) to be attracted and captured.

A particular advantage of the invention is that it provides the normal function of a power bar, while also functioning as a bed bug trap with observers likely not even realizing that it is a bed bug trap, and therefore not signalling a potential bed bug problem. In the hotel and hospitality industry in particular, this is very important. Furthermore, the structures of the bed bug trap and power bar are complementary, and the bed bug trap is able to make use of power and heat from the power bar if desired.

Additional aspects of the invention will be explained in the detailed description which follows.

BRIEF DESCRIPTION OF DRAWINGS

In the accompanying drawings of examples of the invention.

BEST MODE FOR CARRYING OUT THE INVENTION

Figure 1:
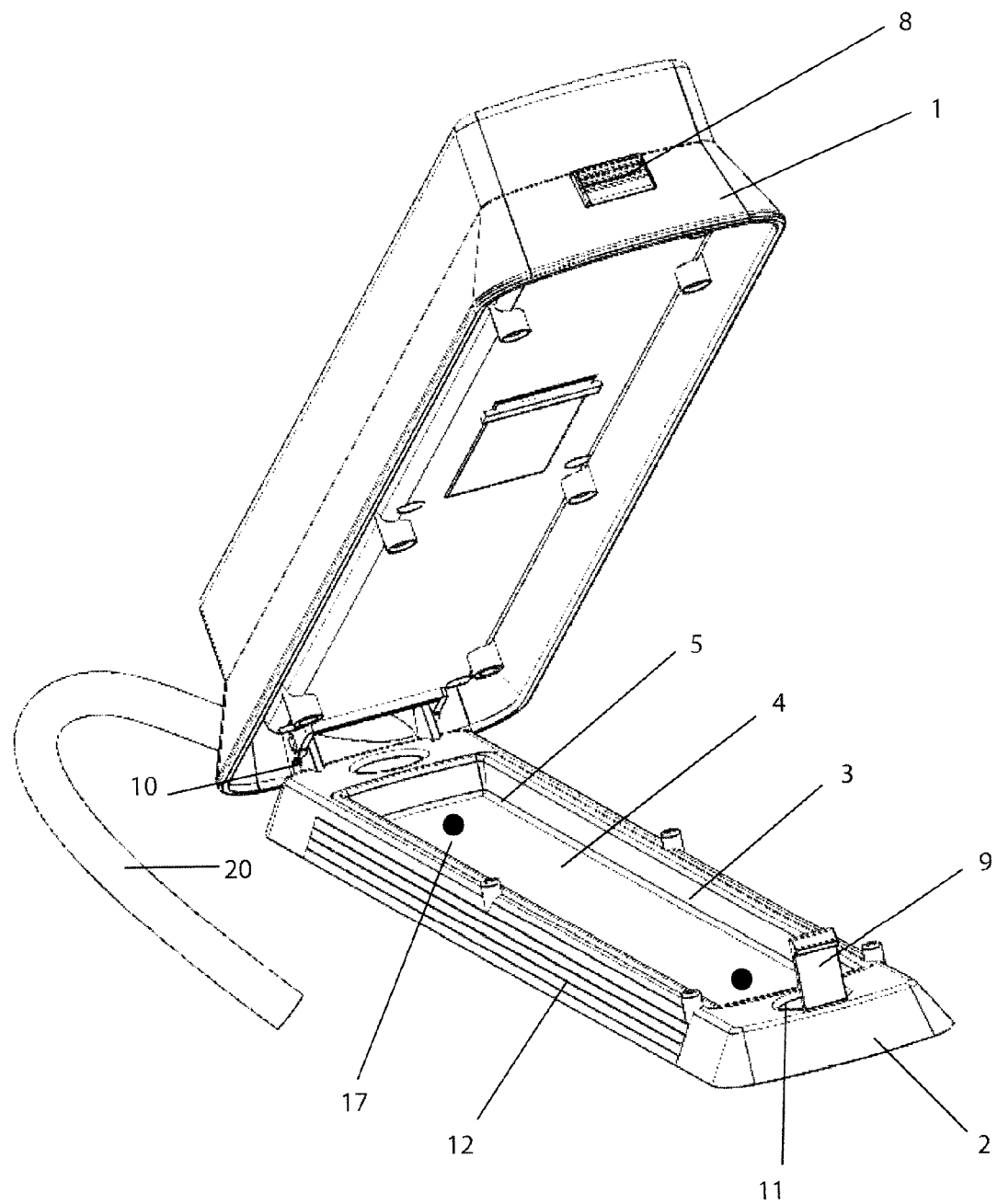
FIG. 1 is a perspective view of a first example of the invention, in the open position.

FIGS. 1-5 show a preferred example of the invention, intended for horizontal placement, i.e. on the floor of a room or on a desk, table, window ledge or other horizontal surface. The assembly includes a generally conventional power bar portion 1, above a bed bug trap portion 2. The two portions may be secured to each other by any suitable means, preferably releasable means so that the portions may be separated from each other, or at least openable one relative to the other. In this example, they are secured to each other by a hinge 10 at one end, and a flexible catch 8 and latch 9 at the other end, but obviously many other conventional attachment means could be used. When the catch 8 and latch 9 are unlocked, the bed bug trap portion 2 can be released from the power bar portion 1 and rotated open for inspection and for replacement of removable trapping means, as described later herein.

The illustrated power bar is of a shape commonly used in North America, but it should be understood that the invention can be adapted to any other power bar shape. The power bar may also include other power outlets, such a one or more USB ports.

Extending from the power bar in conventional fashion is an electrical cord 20, terminating in a conventional plug (not shown) for connection to a power source such as a wall outlet. For North America, a conventional North American 3-prong plug is used, but obviously the plug can be varied to suit individual countries' electrical conventions. Similarly, although 110 volts/60 cycles is the standard for North America, the invention can be readily adapted to other voltages and frequencies, as is conventional.

The power bar portion 1 and the bed bug trap portion 2 are permanently secured to each other in this example, but they could be completely separable, for example by a releasable hinge (conventional hook and pin arrangement), or by catches 8 and latches 9 at each end or opposite sides, or by any other suitable means. In this way, the entire bed bug trap portion could be readily replaced if desired, or at a certain point the user could decide to no longer use the bed bug trap portion, and detach it from the device, leaving just a generally conventional power bar.

The bed bug trap portion 2 includes a recess 3 with bed bug trapping means, such as a glue pad or strip 4 or any other conventional trapping means. The glue pad or strip 4 can be provided in the recess 3 itself, or preferably in a removable and replaceable tray 5.

Figure 2:
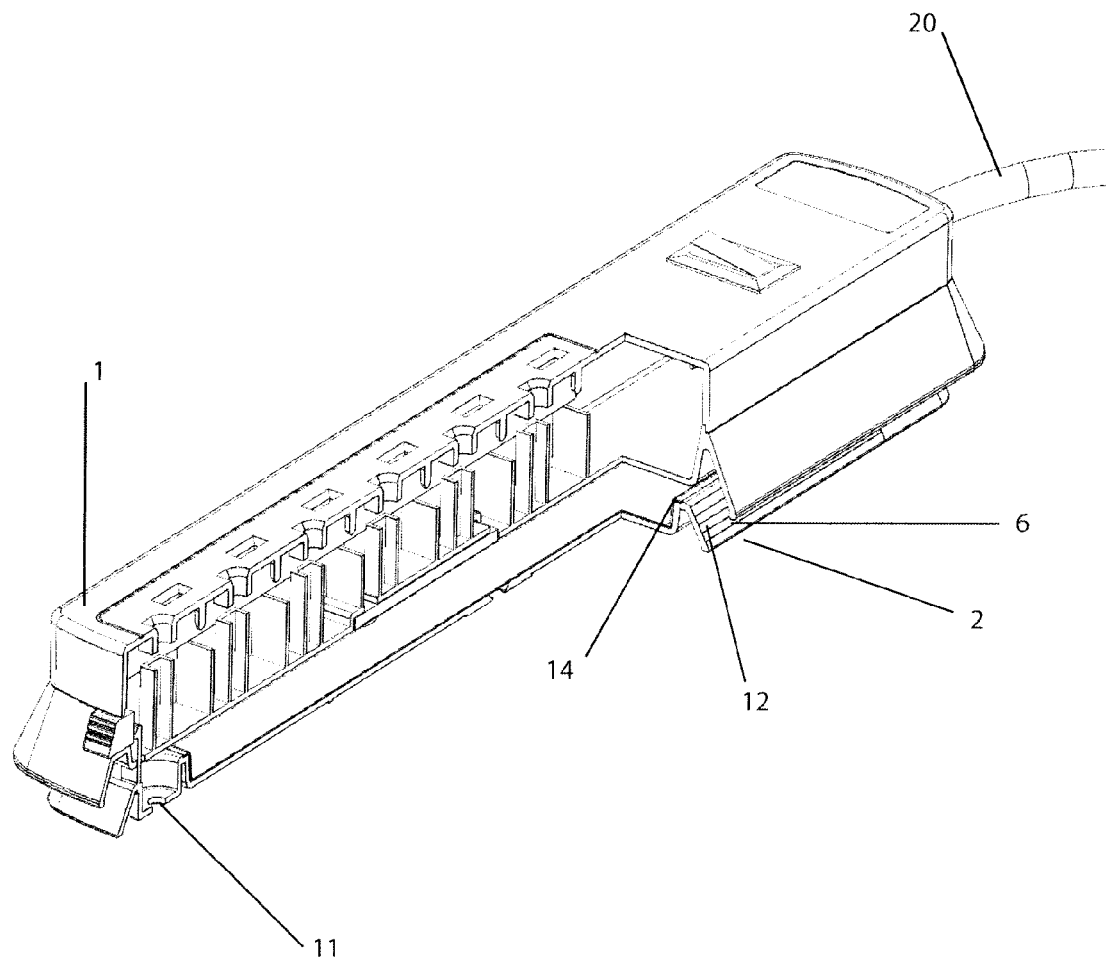
FIG. 2 is a half section view of the FIG. 1 embodiment.

As most clearly seen in FIG. 2, access to the recess is via a small gap 6 formed between the power bar portion 1 and the bed bug trap portion 2. At least a portion of the inclined outer surface 12 of the bed bug trap portion 2 is textured sufficiently for bed bugs to be able to climb it, to pass through the small gap 6. From the gap, they arrive at a small precipice 14, and from there fall onto the glue pad or other trapping means.

The device can be secured to the floor or other horizontal surface by screws through mounting holes 11 if desired, or the device can be just loosely placed on a horizontal surface. As seen in FIGS. 8-11, and as will be described in greater detail below, optional stabilizers 81 may be used to prevent the device from tipping, if it is not anchored to the floor or other horizontal surface.

By unlocking the catch 8 and latch 9 and rotating along the hinge 10, the bed bug trap can be opened and the trap can be checked. If the glue pad or strip 4 needs to be changed, it can simply be removed from the tray or recess 3 and a new one can be installed, or the entire tray can be replaced if the glue strip is integral to the tray.

It is contemplated that the device may be used as a bed bug monitor, for example, as a pest or bed bug detector to regularly check for the presence of bed bugs by trapping one or a few bed bugs. For example, in a hotel, motel, senior home, or other environment where bed bugs may find a desirable habitat, the device may be placed in a room. If any pests or bed bugs are found in the room, the owner can undertake more aggressive measures (for example, steaming, permissible chemical treatment, or other eradication measures) to eliminate the pests or bed bugs before a more serious infestation can develop. In general, it is unrealistic to expect devices such as in the present invention to be the entire solution, i.e. it should not be expected that the device will trap and eliminate all bed bugs in a given space.

Attractants

When bed bugs are hungry, they are attracted to heat, carbon dioxide and chemical or biological attractants, e.g. kairomones, as is well known. Preferably, the device uses one or more of these three attracting means. Ideally, all three attracting means are used, but any combination of the three could be used, or none could be used. That is, such attracting means, though preferably, are not necessarily essential. Bed bugs may be sufficiently attracted just by the fact that the device provides a dark, dry sheltering area, potentially augmented by heat naturally generated by the power bar portion itself.

Heat

Figure 3:
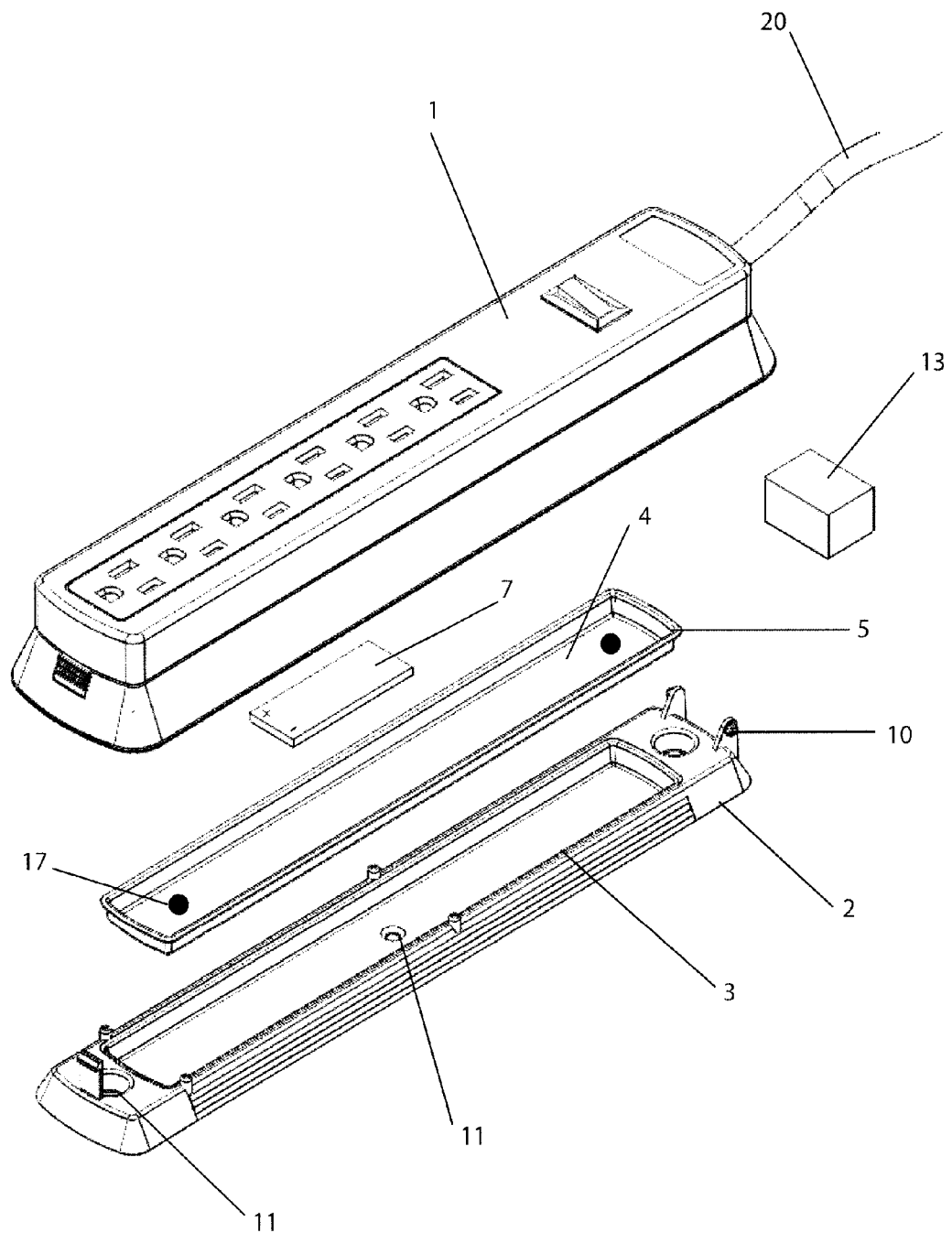
FIG. 3 is an exploded perspective view of the FIG. 1 embodiment.
Figure 4:
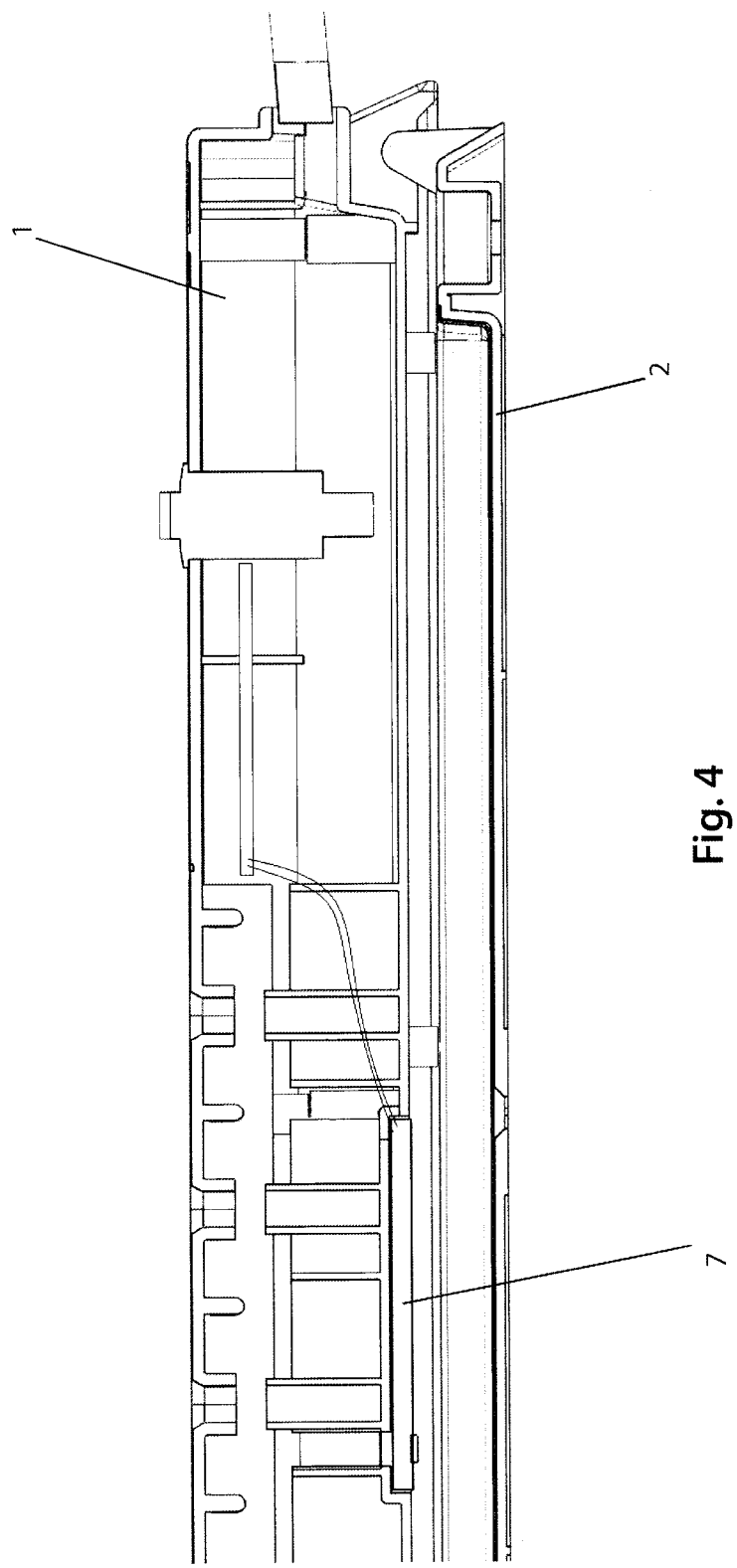
FIG. 4 is a cross-section of the FIG. 1 embodiment.
Figure 5:
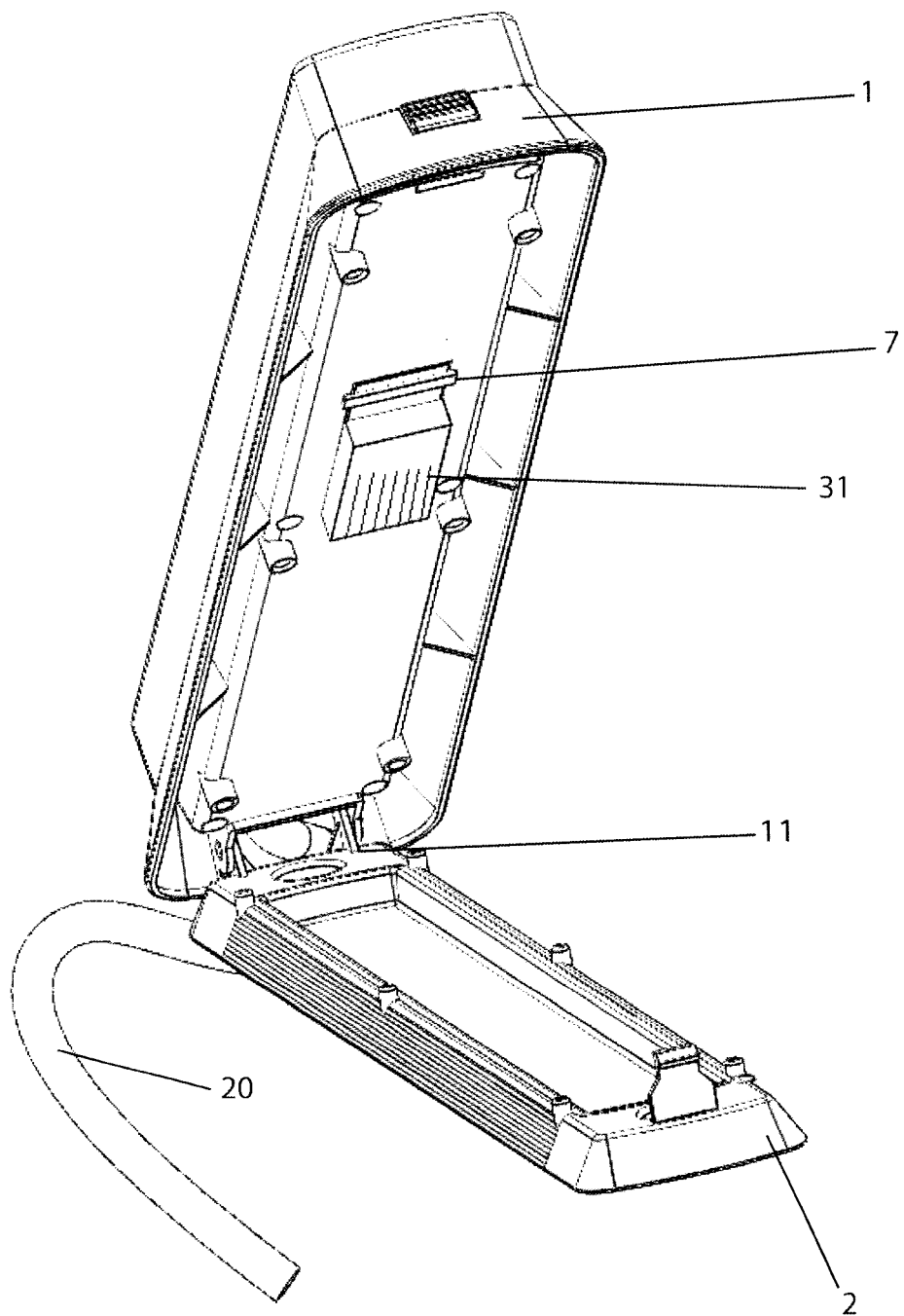
FIG. 5 is a perspective view similar to FIG. 1, showing an air freshening feature.

To provide heat as an attractant, a small electric heating element 7 can be provided, as shown in FIGS. 3-5. The heating element 7 can be installed on the underside of the power bar portion 1, or in any other suitable position, such as within the bed bug trap portion 2. It is electrically connected to draw its power from the power bar to heat the bed bug trap portion 2 whenever the power bar portion 1 is connected to power. If desired, if the power bar is of the type which has an on/off switch, the heating element can be activated by that on/off switch, or if desired, a separate switch could be provided so that heat is only provided when there is some suspicion of bed bug presence. Chemical heating could be provided if desired, but an electrical heating element is preferred since the power bar portion can easily provide power to the heating element.

If the bed bugs are satisfied, i.e. not hungry, they tend to seek dark and cool place for hiding. Therefore, the heating element is not necessary, and if desired it can be substituted by cooling features, such as a small fan or aluminum plate. The fans or aluminum plate can cool down the assembly. A fan can be installed on the bottom of the power bar, the electricity can be supplied by the power bar. Or an aluminum plate can be attached to the bottom of the power bar portion 1 or on the top of the tray portion 2.

Chemical Attractants

Figure 7:
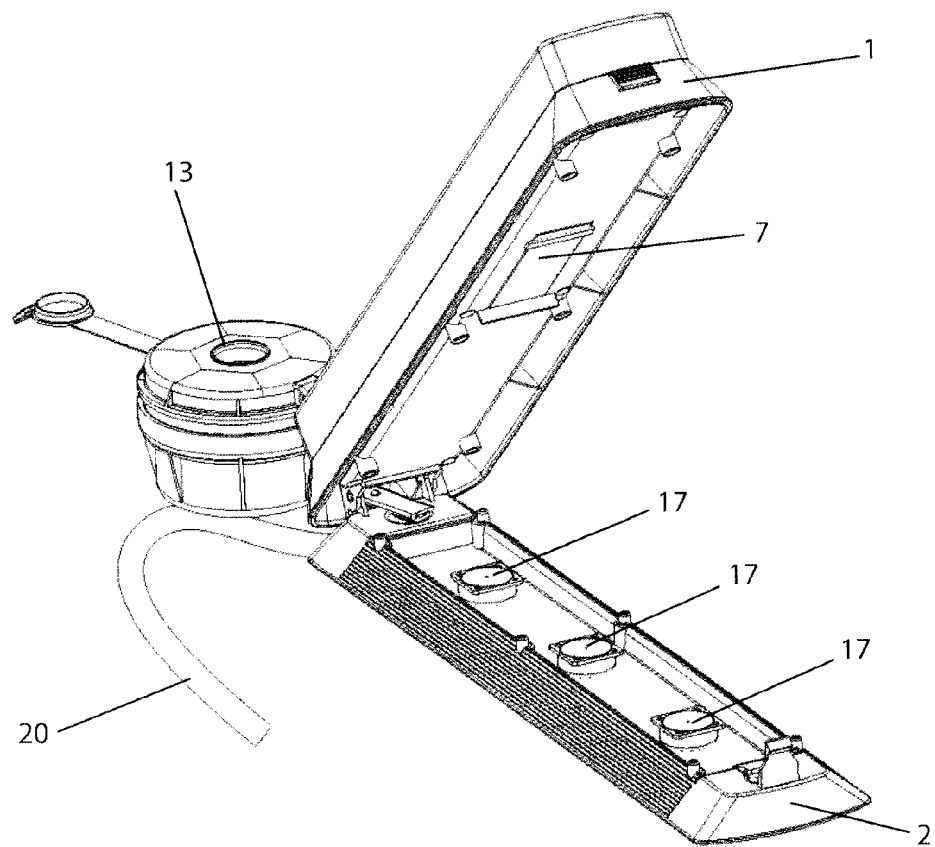
FIG. 7 is a perspective view of the FIG. 6 embodiment, in the open position.

In the recess 3, chemical attractants 17 (e.g. kairomones and/or pheromones) can also be included, either deposited on the surface of the recess (or tray if one is used), or in separate compartments or containers in the recess or tray, as shown in FIG. 7. Alternatively, the chemical attractants 17 can be contained in or be put on the glue pad itself, for example at opposite ends of the tray, or can be in separate containers or pods placed within the recess.

The chemical attractants 17 are optional, but can be any suitable attractants that are known for use in attracting bed bugs, or which may become known.

If both heat and chemical attractants are used, the heat not only acts as a heat lure for bed bugs, it can also accelerate the emission of the chemical attractants to attract bed bugs to the trap. If desired, the chemical attractants 17 could be provided on or near the surface of the heating element 7.

Carbon Dioxide Generator

Figure 6:
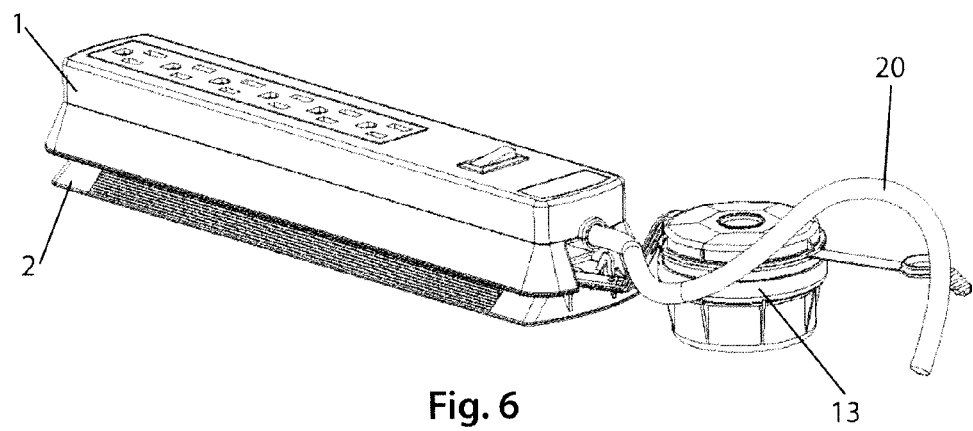
FIG. 6 is a perspective view of an embodiment including a carbon dioxide generator.

A carbon dioxide generator can be provided with the assembly, either for positioning close to the assembly, or preferably for connecting thereto. The carbon dioxide generator can be a carbon dioxide gas cylinder, a dry ice container or any other known carbon dioxide generator. FIGS. 6 and 7 show a carbon dioxide generator 13 in the form of a container in which there are some chemical tablets that can produce carbon dioxide by adding the appropriate liquid. The carbon dioxide generator has an elongated carbon dioxide outlet that can be extended into the trap if desired, or it can be clipped to the device, preferably with the outlet extending into the trap.

Alternatively, the carbon dioxide generator can be a stack of electrochemical cells that decompose organic carboxylated compounds into carbon dioxide. The carbon dioxide generator can be just placed near the assembly or placed on the tray or on the glue pad or strip, or it can be attached to the device, by a clip for example.

The carbon dioxide generator could be a carbon dioxide generator of the general type described in U.S. patent application Ser. No. 13/742,430, publication no US-2013-0180162-A1 (Jul. 18, 2013).

Air Freshener

FIG. 5 shows another optional feature of the invention, namely an air freshening feature. An air freshener 31 in a small container is shown above the heating element 7. The air freshener can be retained by any suitable means, such as by sliding a tab into a slot, for example. The heat generated by the heating element 7 not only works as a bed bug attracting means, but also increases the volatility of the air freshener in emitting a pleasant scent or fragrance. Any kind of conventional air freshener could be used, to emit a variety of scents or aromas, including perfumes, herbs, fruit, flowers, etc. One specific example is the Glade (trademark) Gel Air Freshener, made by SC Johnson.

Even though the air freshener 31 is shown on the top of the heating element 7, as in FIG. 5, it should be understood that the air freshener can be mounted anywhere in the device. For example, it could be on the sides of the power bar, in the mounting holes 11, or on the bed bug trap. The heat for the air freshener does not necessarily come from the heating element 7, i.e. another heating element specifically for heating the air freshener can be provided, or the air freshener can be of a type which works without heat. Of course, the air freshener preferably is mounted so as to be readily replaceable.

Stabilizers

Figure 8:
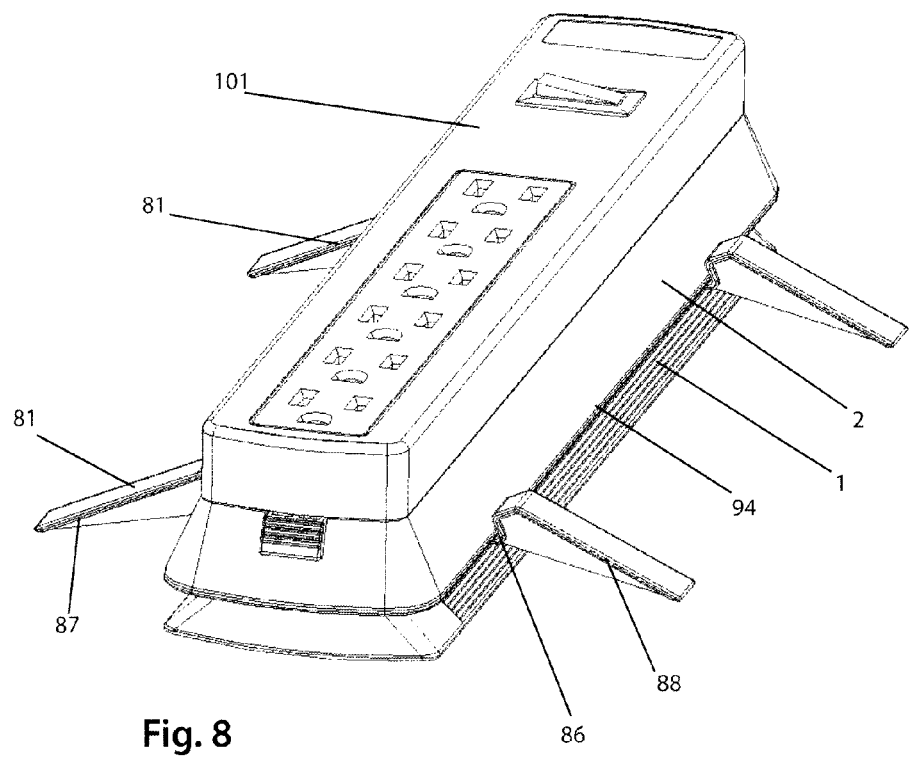
FIG. 8 is a perspective view of an embodiment with stabilizers.
Figure 9:
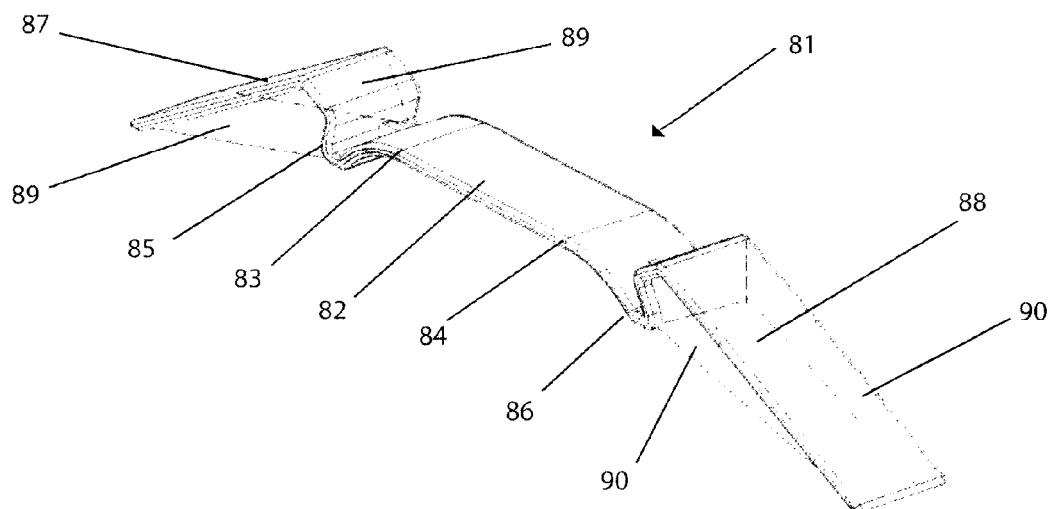
FIG. 9 is a perspective view of one of the stabilizers.

To prevent tipping, the power bar may also include stabilizers 81, as shown in FIGS. 8 and 9. The stabilizers include two support plates installed on respective sides of the power bar. One example of the stabilizers is shown in FIG. 9. The stabilizers are attached to the power bar as shown in FIG. 8.

Referring to FIG. 9, the stabilizers 81 include a bottom plate 82 with two opposed horizontal edges 83 and 84. The two edges 83 and 84 respectively all extend downwardly, horizontal, and then upwardly to respectively form U-shaped slots 85 and 86, and then respectively step downward to form support plates 87 and 88. To prevent breakage of the support plates 87, vertical webs 89, 89' are set between both longitudinal edge of the support plates 87 and both side edges of U-shaped slot 85, and vertical webs 90, 90' are set between both longitudinal edges of the support plate 88 and both edges of U-shaped slot 86.

As shown in FIG. 8, two of the stabilizers 81 are detachably attached to the power bar 101. The U-shaped slots 85 and 86 respectively clip on the bottom edges 94 of both side of the power bar portion 2, with the support plates 87 and 88 on each side of the power bar. To install the stabilizers 81, first release the bed bug trap portion 2 from the power bar portion 1, and then put the bottom plate 82 at the bottom of the power bar portion with each support plate 87 and 88 on each side of the power bar. Since the longitudinal distance between the U-shaped slots 85 and 86 is equal to the width of the bottom of the power bar portion, the two U-shaped slots 85 and 86 are on the bottom edges of the side of the power bar portion 1. Second, clip both the U-shaped slots on the lower edges of both sides 90 and 90' of the power bar portion. Lastly, secure the power bar portion and the bed bug trap portion together. Because the thickness of the U-shaped slot is less than the width of the gap, the bottom plate passes through the gap and the support plates 87 and 88 are on both side of the power bar. Both of the support plates 87 and 88 will touch or be close to the ground and prevent the power bar from tipping.

As shown in FIG. 8, there can be two stabilizers 81 distributed along the longitudinal direction of the power bar. The numbers of the stabilizers can be varied according the length of the power bar and actual usage. For example, there could be only one stabilizer when the power bar is not long; or no stabilizers could be used at all.

Other Insects

The assembly may also be adapted for trapping different types of pests by adjusting attractants. Additional chemical attractants may be used with the assembly to make it even more effective.

The assembly may also be adapted for trapping different types of pests by adjusting the size of the gap and attractants. For example, the assembly may be adapted for trapping roaches with the small gap 6 big enough for roaches to enter.

Optionally, the insect trap portion can be divided into a bed bug trap portion and a roach trap portion. The bed bug trap portion would be accessible by bed bugs through a small gap portion of the gap 6. The roach trap portion would be accessible by roaches through a larger gap portion of the gap 6. Different attractants could be used in the respective trap sections.

Figure 10:
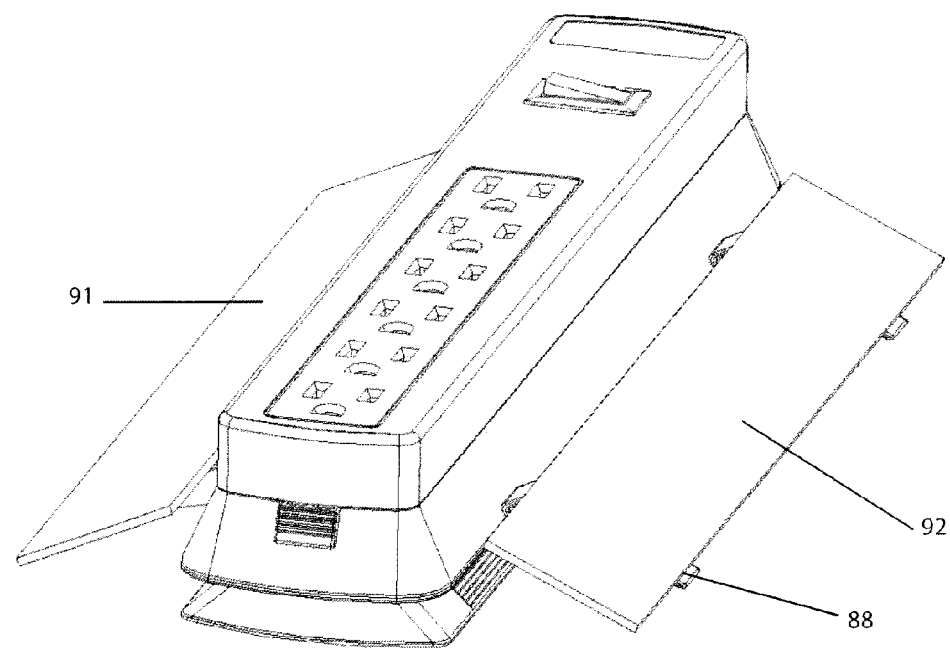
FIG. 10 is a perspective view of an embodiment with stabilizers and an additional trapping means mounted thereon.
Figure 11:
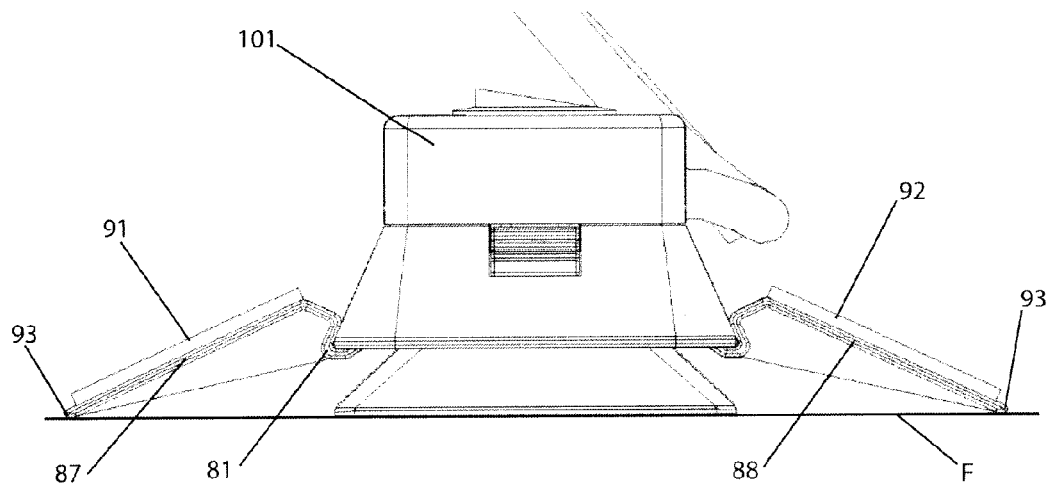
FIG. 11 is an end view corresponding to FIG. 10.
Figure 12:
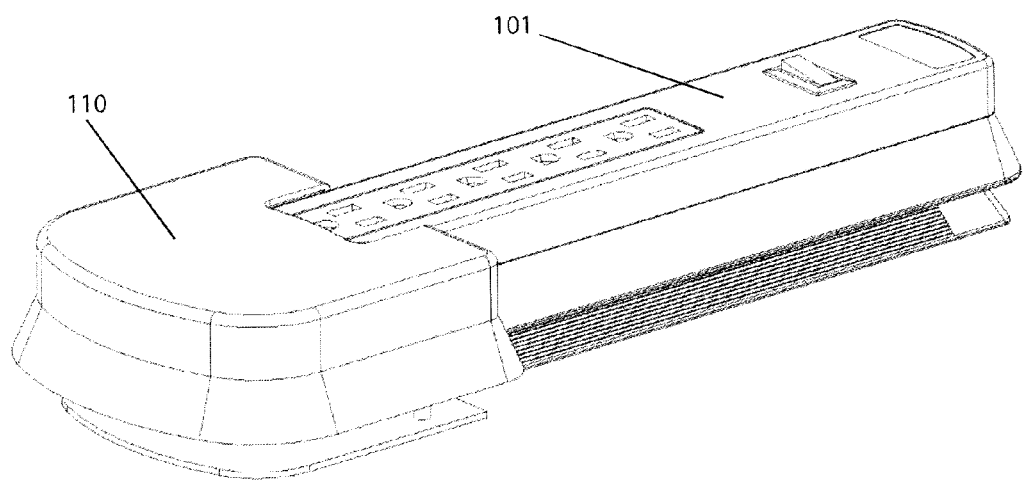
FIG. 12 is a perspective view of an embodiment with a separate insect trap which can be mounted around one end of the assembly.
Figure 13:
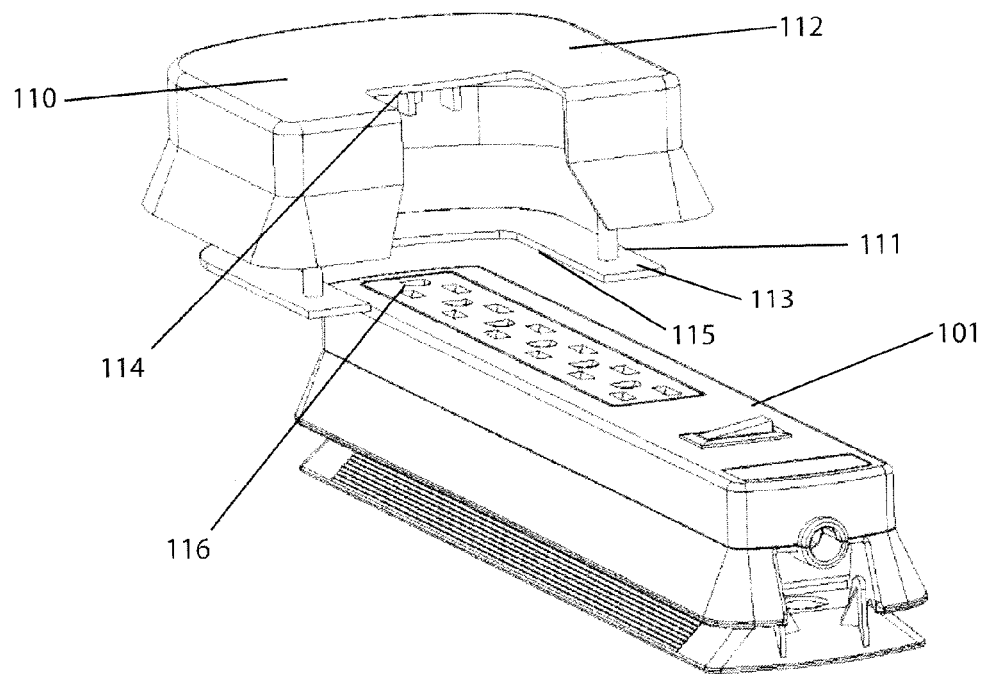
FIG. 13 is an exploded perspective view of the FIG. 12 embodiment.
Figure 14:
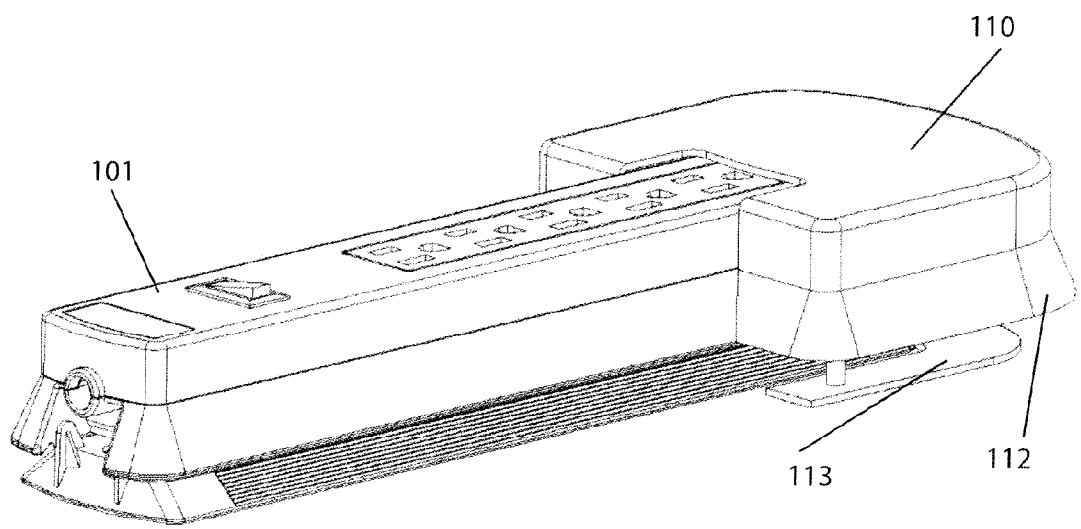
FIG. 14 is another perspective view of the FIG. 12 embodiment.
Figure 15:
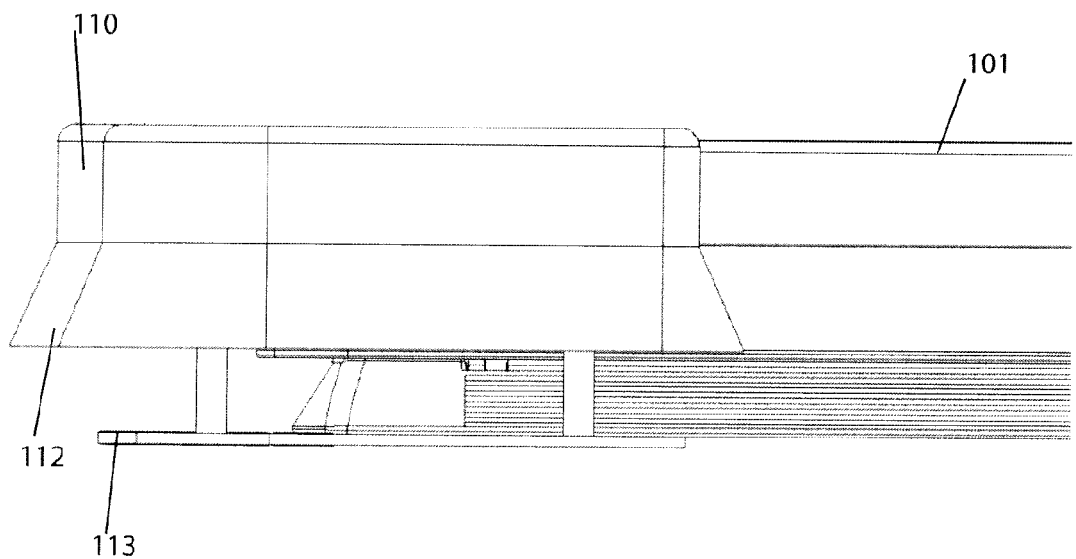
FIG. 15 is a side view of a portion of the FIG. 12 embodiment.

Additional crawling insects traps can also be included in the assembly. FIGS. 10 and 11 show one example of an external roach trap, for example. In this example, two glue boards 91 and 92 are respectively attached to top surfaces of the support plates 87 and 88 of stabilizers 81. To attract insects to the glue boards, lures can be included on the glue boards. Since the support plates 87 and 88 are angled downwardly, the glue boards 91 are sloped downwardly to the floor or other horizontal surface. A second gap 93 or 93' formed between the edge of the boards 91 or 92 and the horizontal surface preferably is big enough that bed bugs can pass under the boards to access the bed bug trap, but larger insects like roaches cannot. When roaches or other crawling insects like ants are attracted by the lure on the glue board 91 or 92, they climb onto the glue boards and are trapped there.

The glue boards 91 and 92 can be detachable or fixed to the upper surface of the support plates of the stabilizers with normal means, such as glue or with tabs inserted into slots. The glue on the glue boards 91 and 92 can be removed and replaced or the glue boards can be replaced. The lure for attracting insects to the glue board can also be included in the bed bug trap.

Separate Insect Trap

FIGS. 12-15 show another example of the invention, in which an additional trap 110 is provided, i.e. a trap in addition to the bed bug trap, for other insects such as roaches or ants. In this example, the additional trap is a module which attaches to the assembly via a dummy plug 114 which can be inserted into one of the power bar electrical outlets 116. The additional trap can be a roach trap or an ant trap, for example.

The additional trap 110 includes a glue board 113, a cover 112, and one or more support rods 111 to connect the glue board 113 and the cover 112. The glue board has a U-shaped opening 115, which one end of the power bar 101 can fit into. Under the cover, there is dummy plug 114, which can be inserted into one of the outlets on the power bar (normally the one closest to the end, for obvious reasons). The additional trap can be any kind of crawling or flying insect trap.

Additional Variations

It will be evident to those knowledgeable in the field of the invention that many variations on the examples described above are conceivable within the scope of the invention. It should therefore be understood that the claims which define the invention are not restricted to the specific examples(s) described above.

Figure 16:
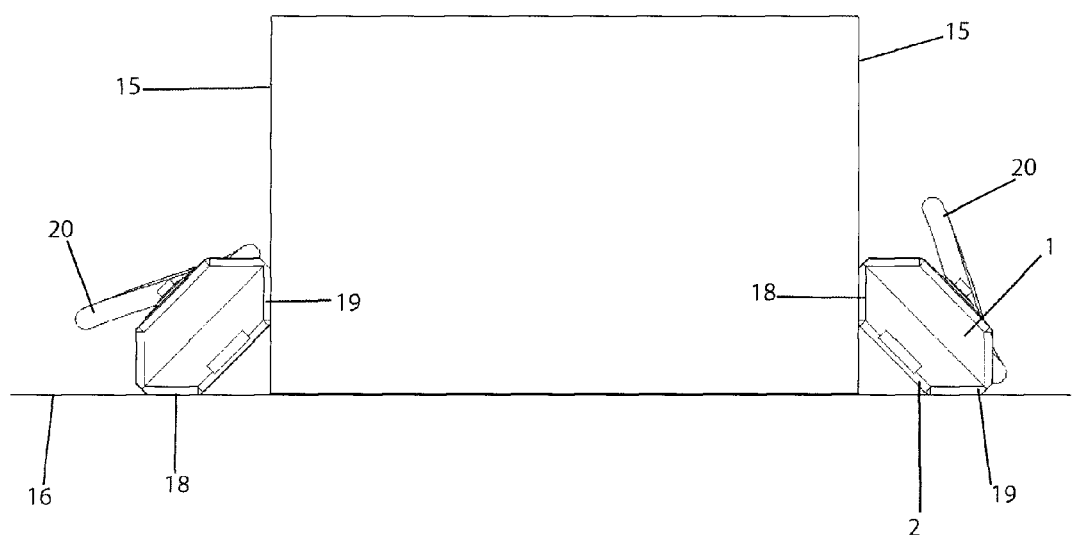
FIG. 16 is an elevation view showing two units of an embodiment of the invention intended for mounting against a vertical surface, such as a bed frame element.

For example, referring to FIG. 16, another example of the invention is shown, where the assembly is intended for vertical placement. In FIG. 16, the surface of a bed frame 15 is vertical and the floor 16 is horizontal. The assembly has two mounting surfaces (surface 18 and surface 19) along the longitudinal direction, perpendicular to each other. For placing it on the right side of the bed frame 15, surface 18 is fixed to the surface of the bed frame 15 and surface 19 is fixed to the floor 16. Surface 18 and surface 19 can be fixed on the surfaces of the furniture or floor by any normal means. For example, they can be fixed by mounting holes and screws. When the assembly needs to be mounted on the left side of the bed frame, the surface 18 is fixed to the floor 16 and surface 19 is fixed to the bed frame 15. In this way, it can be placed on both the right side and left side of the vertical surface without changing the power bar direction. It can also be mounted on either side of a vertical surface of other furniture, like a sofa or bedside table for example.

In order to easily check the bed bug trap while the assembly is installed as shown in FIG. 16, the bug trap portion is designed so that the tray 5 can be pulled out of the device and replaced, and preferably includes a glue pad or strip with or without chemical attractant. Carbon dioxide can also be provided, as described elsewhere herein.

Further variations may be apparent or become apparent to those knowledgeable in the field of the invention, within the scope of the invention as defined by the claims which follow.

INDUSTRIAL APPLICABILITY

The invention relates to detection and trapping of bed bugs.

The invention claimed is:

1. A combined power bar and insect trap assembly, characterized by a power bar portion (1) securable above an insect trap portion (2), the insect trap portion having an internal area (3) accessible by insects via at least one small gap (6), said internal area containing insect trapping means (4, 5).

2. A combined power bar and insect trap assembly as in claim 1, wherein said gap (6) is between the power bar portion and the insect trap portion.

3. A combined power bar and insect trap assembly as in claim 1, wherein the insect trap portion has at least one textured ramp area (12), climbable by insects, positioned so that insects can enter said internal area via said ramp area(s) and said gap(s).

4. A combined power bar and insect trap assembly as in claim 3, wherein said ramp area (12) leads to a precipice (14), and wherein said insect trapping means is a replaceable glue trap (4, 5) positioned so that insects falling off said precipice land on said glue trap.

5. A combined power bar and insect trap assembly as in claim 4, further characterized by at least one insect attracting means (7, 17, 13) associated with the assembly.

6. A combined power bar and insect trap assembly as in claim 5, wherein said insect attracting means is selected from the group consisting of: heat produced by a heating element (7), chemical attractants from a chemical attractant source (17), and carbon dioxide from a carbon dioxide generator (13).

7. A combined power bar and insect trap assembly as in claim 6, further characterized by an air freshener (31) mounted in said assembly.

8. A combined power bar and insect trap assembly as in claim 7, further characterized by at least one additional trap (91, 92; 110), for a different insect type, securable to said assembly.

9. A combined power bar and insect trap assembly as in claim 8, wherein said additional trap comprises an external trap (110) securable to the assembly.

10. A combined power bar and insect trap assembly as in claim 9, wherein a stabilizer (81) is mounted to the assembly to prevent tipping.

11. A combined power bar and insect trap assembly as in claim 10, wherein at least one glue board (91, 92) is secured to a stabilizer (81) as an additional trap.

12. A combined power bar and insect trap assembly as in claim 1, further characterized by at least one insect attracting means (7, 17, 13) associated with the assembly.

13. A combined power bar and insect trap assembly as in claim 12, wherein said insect attracting means is selected from the group consisting of: heat produced by a heating element (7), chemical attractants from a chemical attractant source (17), and carbon dioxide from a carbon dioxide generator (13).

14. A combined power bar and insect trap assembly as in claim 1, further characterized by an air freshener (31) mounted in said assembly.

15. A combined power bar and insect trap assembly as in claim 1, further characterized by at least one additional trap (91, 92; 110), for a different insect type, securable to said assembly.

16. A combined power bar and insect trap assembly as in claim 1, wherein said additional trap comprises an external trap (110) securable to the assembly.

17. A combined power bar and insect trap assembly as in claim 1, wherein a stabilizer (81) is mounted to the assembly to prevent tipping.

18. A combined power bar and insect trap assembly as in claim 17, wherein at least one glue board (91, 92) is secured to the stabilizer (81) as an additional trap.

\* \* \* \* \*